Oct. 14, 1969 J. L. WHEELER ET AL 3,472,961

SYNCHRONIZATION MONITOR APPARATUS

Filed Feb. 28, 1966 2 Sheets-Sheet 1

INVENTOR.
JOHN L. WHEELER
WILLIAM D. POWERS

BY Anthony D. Cennamo
Paul W. Fish
ATTORNEYS

INVENTOR.
JOHN L. WHEELER
WILLIAM D. POWERS
BY Anthony D. Cennamo
Paul W. Fish
ATTORNEYS United States Patent Office 3,472,961

Patented Oct. 14, 1969

3,472,961

SYNCHRONIZATION MONITOR APPARATUS

John L. Wheeler, West Webster, and William D. Powers, Penfield, N.Y., assignors to Xerox Corporation, Rochester, N.Y., a corporation of New York Filed Feb. 28, 1966, Ser. No. 530,559

Int. Cl. H04l 7/04

U.S. Cl. 178—69.5 8 Claims

ABSTRACT OF THE DISCLOSURE

Logical control apparatus wherein the respective count in a plurality of memory registers is selectively increased in a predetermined ordered sequence or reset, depending upon whether the locally generated and received timing pulses are "in" or "out" of time coincidence. In this way predetermined signal occurrence pattern restraints proportional to related counts in the respective memory registers may be employed to selectively signal the condition of synchronization in response to locally generated and received synchronizing signals respectively.

This invention relates to digital communication systems, and more particularly, to control apparatus for monitoring and signalling proper synchronization between locally generated timing pulse patterns and received synchronizing pulses within predetermined limits.

In digital communication systems and data processing systems, it is often desirable to produce a cyclic timing signal pattern which is as closely as possible synchronized with another signal train. For example, in synchronous communication systems, information may be transmitted in a binary code and the digital receiver requires timing information in order to properly interpret the received signals sequence, for example, by conventional sampling techniques.

In a synchronous binary system, for example, a graphic communication system wherein one level indicates black and the other binary level indicates white, the transitions in the signal train are forced to occur at predetermined or fixed time intervals. As is known, the synchronizing problems then become that of properly phasing the receiver clock such that the received synchronous signal train may be properly decoded on a bit and frame basis. Frame synchronization is usually accomplished by reserving a portion of successive transmission intervals, for example, between lines in line-by-line transmission of an original document, for sending synchronizing signals which may be employed to initially synchronize and periodically rephase the receiver timing pattern generator. The synchronization method employed in a particular system may depend upon the type of system—that is—either a simplex or full duplex data system. In the full duplex system, a loss of synchronization can be made known to the transmitting station and the missed portion of the message repeated. In a simplex system, a loss of synchronization generally results in a missed portion of a message at least for the synchronous information train becomes garbled at the receiver due to loss of synchronization.

In a number of communication applications it is desirable to operate a start-stop system wherein a data terminal is adapted to receive a sequence of short messages from a number of different transmitters. With the transmitters located at various distances from the receiver, the synchronizing and synchronization monitoring problems are increased because messages arrive at the receiver with different phasings of the synchronizing signal. Thus, the receiver must be able to rephase its receiver clock for each message.

In such communication systems it is common practice to transmit an initial frame synchronizing signal or synchronizing burst prior to the transmission of information. It is desirable to insure that the receiver clock has been properly phased in response to received synchronizing signals and depending upon such parameters as the stability of the receiver timing source and the uniqueness of the synchronizing character, it is further desirable to insure that the receiver clock is properly phased to prevent the loss of transmission time during which received information would be unintelligible.

It is therefore an object of the present invention to provide logical means for monitoring the rephasing of receiver clock in a communication system.

It is another object of the present invention to simplify the detection and proper maintenance of synchronization of a receiver timing circuit in a communication system within predetermined criteria.

It is a further object of the present invention to simplify detecting a state of synchronization between monitored signals and locally generated reference signals within a predetermined pattern sequence.

It is yet another object of the present invention to provide monitoring apparatus for detecting the continued synchronous condition between a pair of timing pulse patterns within predetermined limits.

In accomplishing the above objects and other desirable aspects, applicants have invented a novel logical control apparatus which permits the simultaneous monitoring of coincidence or non-coincidence conditions on a time basis between locally generated timing patterns and received timing pulses and the generation in response thereto of a net count proportional to the number of successive non-coincident conditions between successive coincident conditions. In accordance with applicants' invention, the respective count in a plurality of memory registers is selectively increased in a predetermined ordered sequence or reset, depending upon whether the locally generated and received timing pulses are "in" or "out" of time coincidence. Thus predetermined signal occurrence pattern restraints proportional to related counts in the respective memory registers and similar to a flywheel effect may be employed to selectively signal an "in" or "out" of synchronism condition in response to locally generated and received synchronizing signals respectively.

For a more complete understanding of applicants' invention reference may be had to the following detailed description in conjunction with the drawings in which.

While the present invention is equally applicable to all graphic and general information communication systems, it will be described in conjunction with a facsimile system.

Figure 1:
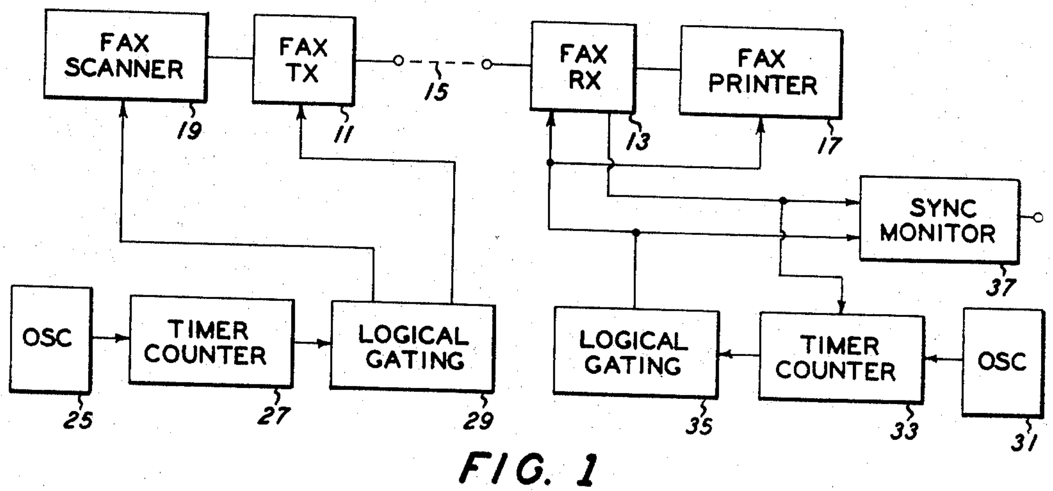
FIG. 1 is a block diagram of a facsimile system incorporating the principles of applicant's invention.

Referring now to FIG. 1, there is shown a block diagram of a conventional facsimile system employing the synchronization monitor control apparatus in accordance with the present invention. As shown the facsimile system comprises a transmitter 11, a receiver 13 and an interconnecting communication link 15. The respective transmitter-receiver apparatus 11 and 13 may comprise any compatible system known in the art. For example, they may comprise a frequency-shift keyed transmitter which applies a series of predetermined frequencies to the transmission link interconnecting the transmitter and receiver in response to information signals applied to the input of the transmitter. In such an example the receiver would comprise a demodulator which in response to received signals would generate or reconstitute the information signals applied to the transmitter. Alternatively, the respective transmitter and receiver may comprise digital circuitry for applying two level information signals to the interconnecting communication link in response to coded information signals applied to the transmitter and for reconstituting the binary or data signals at the receiver. The output of the receiver may be utilized in any of the well known data communication systems, for example, for driving a facsimile printer 17.

As in the conventional facsimile system, scanner 19 explores an original document along some predetermined raster or pattern of sequential lines and derives video signals which correspond to the optical density of the original document to be transmitted. These video signals are coupled to the input of the facsimile transmitter 11 which in turn generates appropriate signals for transmission over the communication link 15 which may, for example, comprise wire lines, radio circuits, etc.

The generation of the video signals and the transmission thereof, as well as the reception and utilization at the receiver, are under control of a basic timing signal pattern commonly known as a clock or basic timing frequency. As shown in FIG. 1, the transmitter timer may comprise an oscillator 25, a timing counter 27, and logical gating means 29. Outputs from the logical gating means, which select appropriate timing pulses generated by timing counter 27, selectively control the operation of the scanner 19 and transmitter 11. Additionally, the logical gating means 29 inserts, in accordance with a predetermined scheme, synchronizing pulses for controlling the rephasing of a similar timer at the receiver 13.

As shown, the basic timing circuit at the receiver is similar to that at the transmitter and may comprise an oscillator 31 coupled to actuate a timing counter 33 which in turn drives logical gating means 35. As is known in the art, the synchronizing pulses coupled to the communication link 15 by the transmitter 11 are received by the facsimile receiver 13 and utilized to rephase or synchronize the local receiver clock with the transmitter clock. As hereinbefore stated such a synchronization method is known in the facsimile art.

As hereinabove stated, it is often desirable to require the proper reception of a number of synchronizing pulses before the receiver is enabled. Further, as is known in the art, it is often advisable in order to avoid lost transmission time to signal a ready condition to the transmitter indicating that the receiver is synchronized. Sync monitor 37 is in accordance with the principles of the present invention responsive to a predetermined sequence or pattern of received synchronizing signals and locally generated synchronizing pulses emanating from logical gating means 35 to selectively generate synchronous condition indicating signals.

As hereinabove stated, it is possible in accordance with the present invention to determine not only that synchronizing pulses have been received but that a plurality have been received in a predetermined sequence. As hereinafter will be more fully explained the comparison of the locally generated pulses emanating from logical gating means 35 and the received synchronizing pulses provide a basis for not only determining that a synchronous condition has been established but that it is maintained within a predetermined pulse occurrence pattern. The output of the sync monitor 37 may be coupled, for example, to a reverse supervisory signalling channel for signalling the establishment and maintenance of a synchronous condition.

Figure 2:
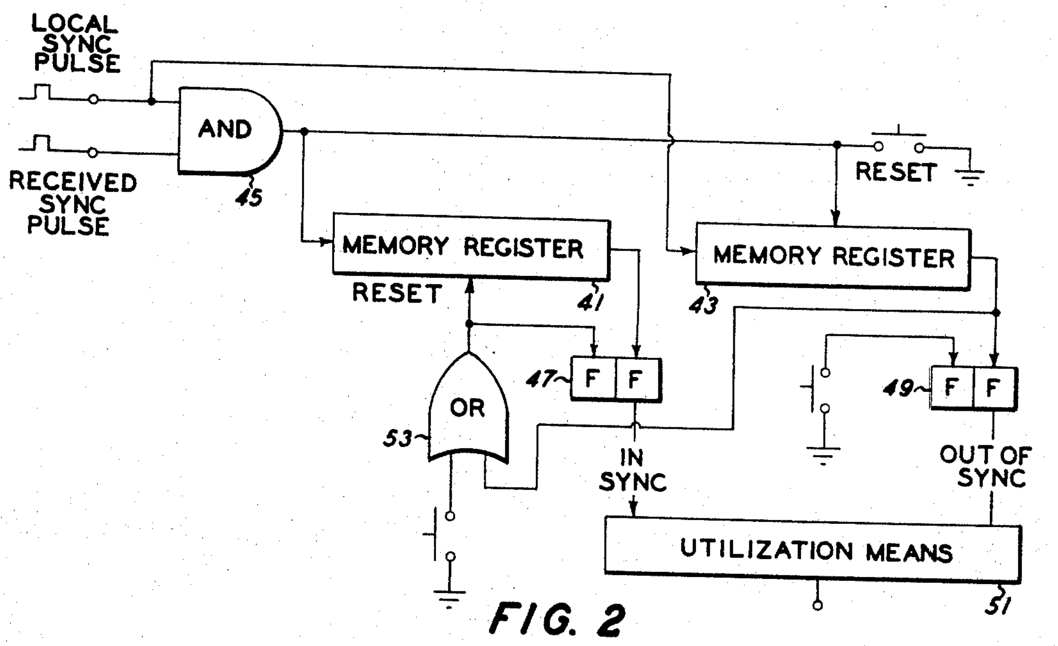
FIG. 2 is a block diagram of a sync monitor apparatus in accordance with one embodiment of the principles of applicants' invention.

Referring now to FIG. 2, there is shown a block diagram of a sync monitor in accordance with a first embodiment of the principles of the present invention. As shown, the sync monitor control apparatus comprised first and second separately energizable memory or information storage devices 41 and 43 and logical gating means 45. Output pulses from gating means 45 signals a coincidence between locally generated sync pulses and received sync pulses and in response to such coincidence simultaneously increases the content of the in-sync memory 41 while resetting or erasing the contents of the out-of-sync memory 43. As shown, the respective output from the last stage of the in-sync and out-of-sync memory devices 41 and 43 may be coupled to the input of first and second indicator flip-flops 47 and 49. Thus, when a predetermined count is registered or accumulated in either of the memory registers, the respective flip-flop associated therewith will be set to a predetermined condition indicating an in-sync or out-of-sync condition, respectively. The outputs of the indicator flip-flops 47 and 49 are coupled to utilization means which may include means for signalling a loss-of-sync through a reverse supervisory signalling channel or alarm means to alert an operator at the receiver that the receiver is no longer in sync with the transmitter. Similarly the output of flip-flop 49 may be coupled by OR gate 51 to reset the "in-sync" memory 41.

In operation the memory or information storage devices 41 and 43 which may comprise a plurality of cascaded bistable elements in a counter configuration as well as the indicator flip-flops 47 and 49 would be initially reset, for example, by actuating the switches shown, thereby resetting the bistable elements to a predetermined condition, for example, binary zeros. The locally generated sync pulses, for example, from logical means 35 are coupled as one input to AND gate 45 and to the input of memory register 43. The received sync pulses are coupled as the other input to the two input AND gate 45. As is known in the art, an output from AND gate 45 is generated when the two inputs thereto are present simultaneously. The signals emanating from AND gate 45 whenever the local sync pulse and the received sync pulses are simultaneously present at the inputs of gate 45 are employed to count up or increase the count in memory device 41 while simultaneously resetting or erasing the previously accumulated count in the memory device 43.

Thus in operation the information or count stored in the in-sync memory device 41 represents the net count of the number of received sync pulses which were in phase with the locally generated pulses. Similarly the information or count in the out of sync memory device 43 represents the count of locally generated pulses which were not in synchronism with the received pulse during the interval intermediate successive coincident or in phase conditions between the locally generated and received sync pulses. An additional delay could be added to the output of AND gate 45 to insure proper resetting of memory 43 however in the usual case the propagation delay of gate 45 will be sufficient to insure resetting of memory 43 in response to each signal emanating from gate 45. Further as is known in the art the simultaneous or substantially simultaneous triggering and resetting of a bistable element have a cancelling effect with the resetting feature generally overriding or predominating the ultimate state of the bistable device.

By manipulating the respective number of bistable elements or stages in the first memory device 41 it is possible to impose a variety of predetermined restrictions on the number or occurrence pattern of received sync pulses which must be in synchronous with the locally generated pulse before an "in-sync" condition will be signalled when the receiver initially responds to a synchronizing pattern. Similarly by varying the number of stages in memory 43 a like variety of predetermined pattern restrictions may be imposed on the number of sync pulses which must be properly received in a predetermined portion of the transmission time before a "loss-of-sync" condition is signalled.

As hereinabove stated, it is advantageous to permit the loss or improper reception of a predetermined number of transmitted synchronizing pulses before signalling a loss of sync condition. This permits the receiver to continue to operate even though it has not received each successive sync pulse. The number of respective stages in the first and second memory devices 41 and 43 would be a function of the relative stability of the oscillator at the transmitter and receiver. Thus, in a typical facsimile embodiment, a receiver may be capable of generating useable copy, i.e., properly decoding the received information, even though up to six successive synchronizing pulses have not been properly received. As hereinbefore stated the number of synchronizing pulse misses which may be tolerated is a function of the stability of the receiver and transmitter timing clock generators and in a typical example may be as high as six. In such a case, the out-of-sync counter and the in-sync counter may each comprise three stages with appropriate gating and/or resetting features. In such a case, a net count of seven would have to be registered in the in-sync counter 41 before an "in-sync" condition would initially be established and the net count of six would have to be recorded in the "out-of-sync" counter 43 before an out-of-sync condition would be signalled after sync is initially established.

Figure 3:
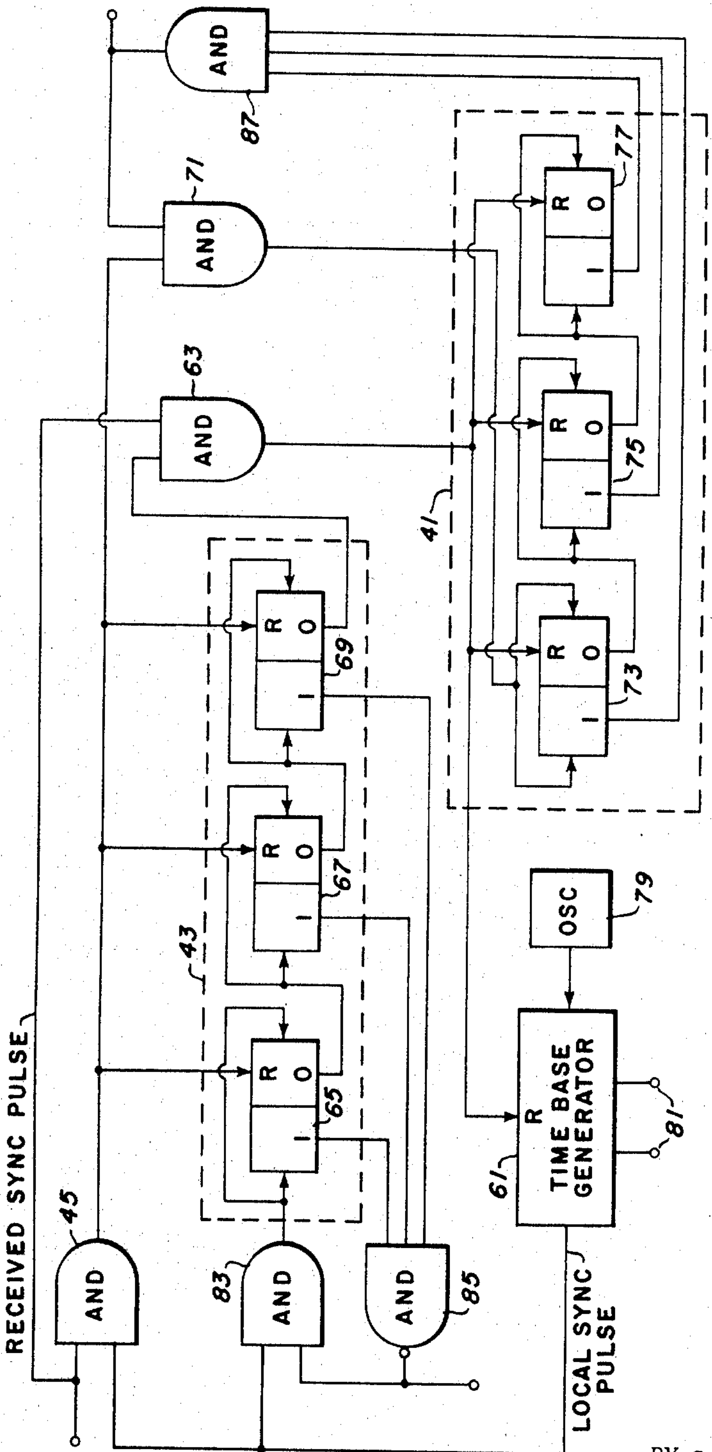
FIG. 3 is a block diagram of a sync monitor apparatus in accordance with another embodiment of the principles of applicants' invention.

Referring now to FIG. 3 another embodiment of a sync monitor apparatus in accordance with the present invention will now be described. As hereinabove stated it is desirable once a synchronous condition has been established between a transmitter and receiver station that the loss of synchronism not be signalled until a predetermined number of received sync pulses have failed to coincidently occur with a locally generated sync pulse. Further, it would be desirable to attempt to re-establish sync after a predetermined number of sync pulses have been improperly received. The embodiment illustrated in FIG. 3 permits this versatile operation in which resynchronizing will be automatically attempted after a predetermined number of synchronizing pulses from the transmitter have not been received properly before an out-of-sync condition will be signalled.

In accordance with the embodiment illustrated in FIG. 3, a window is opened to initially permit the received synchronizing pulses to reset the receiver time base generator 61 thereby attempting to rephase or synchronize it properly with the transmitter time base generator. Upon coincidence of a locally generated and received synchronizing pulse, the window is closed and the time base is thereafter reset by the received synchronizing pulse only after a predetermined number of non-coincident conditions between the received and locally generated sync pulses have occurred. In accordance with this embodiment, not only are the net count of coincident and non-coincident conditions between the received and locally generated sync pulse accumulated in the respective registers 41 and 43 but logical gating means is arranged to selectively permit the received synchronizing signal to pass through gate 63 to reset the time base.

As hereinabove described in conjunction with FIG. 2 the coincident and non-coincident condition between received and locally generated sync pulses is determined by AND gate 45. The output pulses emanating from AND gate 45 are coupled to selectively reset a first plurality of bistable elements 65, 67, 69 comprising "out-of-sync" memory 43 and through gate 71 to increase the count of "in-sync" memory 41. The respective elements of the registers 41 and 43 may comprise, for example, transistorized bistable multivibrators wherein a first stable state is designated a binary "1" and second stable state is designated a binary "0." As shown the respective elements are coupled in a counter configuration in which the leads associated therewith having an arrow represent triggering or reset inputs and those not having an arrow represent a level output. As is known in the art the respective inputs to the transistorized multivibrator may be coupled in the counter configuration by employing a common input, i.e., one to each side of the bistable device, through appropriate gating while employing, for example, collector steering to enable each element to assume the opposite state in response to successive triggering pulses. The logical gates shown are AND gates in which, as is known, an output signal is generated each time a signal is simultaneously present on each of its input lines.

In operation the respective bistable elements of memories 41 and 43 could manually or automatically be set to a preset condition. Alternatively, the normal operation of the local sync pulse could initially count up memory 43 via gate 83. In accordance with one aspect of applicants' invention with the terminal or highest order bistable element 69 in memory 43 in a predetermined or preset condition, for example, by a switch or the normal reset operation, a window is opened whereby time base generator 61 may be reset. With at least the highest order stage of memory 43 preset or advanced to a predetermined condition, initially received synchronizing pulses are coupled via AND gate 63 to the reset terminal R of time base generator 61. Thus, the initially received synchronizing pulses reset the time base generator to a predetermined condition thereby attempting to synchronize the locally generated sync pulse with the received sync pulse. Thereafter as hereinabove described in conjunction with FIG. 2 the locally generated synchronizing pulse and the received synchronizing pulse should remain synchronized in the absence of any error in transmission thus generating an output from AND gate 45. Each output from AND gate 45 resets the out-of-sync counter 43 by coupling an appropriate signal to the reset terminal R of the respective bistable elements 65, 67, and 69. Additionally, as long as AND gate 71 is properly energized, i.e., an in-sync condition has not been signalled, in which each of the respective elements 73, 75, and 77 of memory 41 would be in the binary "1" condition, this same signal emanating from AND gate 71 is coupled to the input of the lowest element bistable element 73 of memory 41. In response to the successive pulses emanating from gate 71 the count in in-sync memory 41 would be increased in accordance with the normal ordered sequence corresponding to the binary code.

Time base generator 61 has coupled to its input the output of an oscillator 79 which selectively drives the time base generator which, for example, may comprise a plurality of bistable elements in a counter configuration through a predetermined ordered sequence or count. Each pulse emanating from gate 63 resets the time base 61 to a preset condition thereby attempting to synchronize the locally generated sync pulse with the received sync pulse. Additional timing pattern or waveforms may be taken from terminals 81 and, as is known in the art, may be employed to control the operation of the receiver apparatus in accordance with predetermined pulse timing. The locally generated synchronizing pulses emanating from the time base generator are coupled, as hereinabove stated, as one input to AND gate 45 and additionally to AND gate 83. The other input to the AND gate 83 is generated by an AND gate 85 having its respective inputs coupled to, for example, the one or true side of the bistable elements 65, 67 and 69 comprising memory 43. In absence of a predetermined count in the respective bistable elements of memory 43, the locally generated sync pulses are enabled to pass through AND gate 83 to the lowest order stage or element of memory 43. Thus, as hereinabove described in conjunction with FIG. 2 the locally generated sync pulses are selectively enabled to increase the count in the out-of-sync memory 43.

By initially resetting or advancing the count so that at least the highest order stage 69 of out-of-sync memory 43 contains, for example, a "1" condition, initially received synchronizing pulses are enabled to pass through AND gate 63 and reset the timing base 61. After the first coincidence is detected, each bistable element of out-of-sync memory 43 is reset. Thereafter until a predetermined number of non-coincident conditions are detected between the locally generated sync pulse and the received sync pulse, the received synchronizing pulses are not permitted to pass through AND gate 63 to reset the time base generator 61. Thus, after the first coincidence of the received and locally generated syn pulses, the received synchronizing pulses are no longer automatically coupled via AND gate 63 to the reset terminal R of time base generator 61 but only during predetermined timing intervals.

After the initial coincidence between the received synchronizing and locally generated synchronizing pulse the time base generator under the influence of oscillator 79 should remain in synchronism with the transmitter. As hereinbefore described the locally generated synchronizing pulses will increase the count in the absence of detected coincidence between the locally generated and received synchronizing pulses as an overriding effect of a pulse at reset terminal R of flip-flops 65, 67 and 69 is not present. As described in conjunction with FIG. 2, the out-of-sync counter has to generate a predetermined count under the influence of a locally generated synchronizing pulses before an out-of-sync condition is signalled. As the count in the out-of-sync counter 43 increases, the respective bistable elements goes through a predetermined pulse pattern corresponding to the binary sequence. In order to attempt to re-establish sync prior to the signalling of an out-of-sync condition, gate 63 is selectively controlled by the state of the highest order stage 69. Thus, in response to a predetermined count in memory 43, i.e., four in the example shown corresponding to four non-synchronous or coincident conditions between the received and locally generated synchronizing pulses, AND gate 63 is again energized or primed so that the received synchronizing signal can reset the time base generator 61. In this manner an attempt to re-establish synchronism may be made prior to the signalling of an out-of-sync condition. The re-establishment of synchronism would reset the out-of-sync counter and an out-of-sync condition would not be signalled until the predetermined number of synchronizing pulses failed to establish a coincidence between the received and locally generating synchronizing pulses within the timing interval defined by the out-of-sync counter.

The in-sync counter 41 illustrated in FIG. 3 corresponds in function to that described in conjunction with FIG. 2; namely, a predetermined number of coincident conditions between the locally generated and received synchronizing pulses must occur prior to the signalling of an in-sync condition. Such in-sync condition may be employed by utilizing a signal from AND gate 87 to trigger an appropriate indicator means, for example, a flip-flop as disclosed in conjunction with FIG. 2. Likewise an appropriate out-of-sync condition may be signalled by utilizing an appropriate signal from AND gate 85 to indicate an out-of-sync condition.

In the foregoing description there is disclosed new methods and novel apparatus for monitoring and indicating synchronism between locally generated pulse patterns and received synchronizing pulses within predetermined pulse pattern limits. By storing or accumulating an information count in respective memories proportional to the number of successive coincidences between received and locally generated sync pulses and the number of non-coincident therebetween during the interval between successive coincidences, separate and independent "in-sync" and "out-of-sync" criteria may be established corresponding to a flywheel effect. The invention has been described in terms of two specific embodiments of a sync monitoring apparatus, but many modifications will suggest themselves to those skilled in the art for accomplishing results substantially identical to those of the invention by following applicants' teaching. Thus, the particular transmission system and form of apparatus employed for scanning and recording purposes may be replaced by others known in the art by adapting such systems to perform in substantially the same manner as taught by the applicants. The particular set of internal or locally generated control signals and transmitted synchronizing signals described hereinabove are obviously not limiting, nor are the methods for generation and utilization of the control signals. Thus, depending upon the uniqueness of the transmitted synchronizing pulse for establishing frame synchronization, the methods and apparatus for signalling and re-establishing synchronous conditions may be made operable only during an initial setup period or throughout an entire transmission time. Further the particular logical circuitry utilized in practicing the invention is, as is known in the art, not unique and may be subject to wide variation without departing from the spirit of applicants' invention.

The foregoing description and drawings are to be understood to be illustrative only and the invention is to be interpreted broadly in terms of basic concepts. It is therefore applicants' intention to be limited only as indicated by the scope of the following claims.

What is claimed is:

1. In a synchronous binary or digital data communication system, a combined in-sync and sync-loss monitor comprising:
first and second information storage memory registers, an AND gate,
means for coupling received synchronizing signals as one input to said AND gate,
means for coupling locally generated synchronizing signals as a second input to said AND gate and to the input of said second memory register for increasing the count therein in a predetermined ordered sequence, and
means for coupling the output of said AND gate for simultaneously increasing the count of said first memory register in accordance with a predetermined ordered sequence and for resetting said second memory register to a predetermined count.

2. The combined in-sync and sync-loss monitor defined in claim 1 wherein said first and second storage memory registers comprise a plurality of bistable elements arranged in a counter configuration and additionally including means responsive to a predetermined count in said first and second memory registers for signalling an in-sync and out-of-sync condition, respectively.

3. The combined in-sync and sync-loss monitor defined in claim 1 additionally including reset means responsive to a predetermined count in said second memory register for resetting or erasing the informational content of said first memory register to a predetermined count.

4. In a synchronous binary or digital communication system including at least one transmitter and one receiver a combined in-sync and sync-loss monitor control apparatus responsive to received and locally generated synchronizing signals comprising:
local and received input terminals adapted to receive locally generated and received synchronizing signals, respectively,
first memory means responsive to a predetermined pattern occurrence restraint on the received and locally generated synchronizing signals for signalling the initial establishment of an in-sync condition between the transmitter and receiver, said first memory means including a binary counter,
second memory means responsive to a predetermnied patern occurrence restriction on the received and locally generated synchronizing signals for signalling a loss of sync condition between the transmitter and receiver, said second memory means including a binary counter,
logical gating means for determining coincident or in-phase relationships between individual ones of said received locally generated synchronizing signals, and
means coupled to the output of said logical gating means for simultaneously increasing a count in said first memory means and for resetting said second memory means to a predetermined informational content state.

5. The combined in-sync and sync-loss monitor control apparatus defined in claim 4 additionally including reset means responsive to a predetermined count in said second memory means for erasing or resetting the informational content of said first memory means to a predetermined count.

6. The improved sync monitor defined in claim 4 additionally including bistable indicator means responsive to predetermined counts in said first and second memory means for signalling an in-sync and out-of-sync condition, respectively.

7. In a synchronous binary or digital communication system including at least one transmitter and one receiver a combined in-sync and sync-loss monitor for controlling the resetting of a time base generator at the receiver for establishing synchronism between the time base generator at the transmitter and receiver respectively comprising local and received input terminals adapted to receive locally generated and received synchronizing signals, respectively, first memory means responsive to a predetermined pattern occurrence restraint on received and locally generated synchronizing signals for signalling the initial establishment of an in-sync condition between the transmitter and receiver, said first memory means including a binary counter, second memory means responsive to a predetermined pattern occurrence restraint on received and locally generated synchronizing signals for signalling a loss of sync condition between the transmitter and receiver, said second memory means including a binary counter, logical gating means for determining coincident or in-phase relationships between individual ones of said received and locally generated synchronizing signals, means coupled to the output of said logical gating means for simultaneously increasing the count in said first memory means and resetting said second memory means to a predetermined informational count, and AND gate means coupled to said received input terminal and responsive to said received synchronizing signals and a predetermined count in said second memory means for selectively coupling reset signals to said receiver time base generator.

8. The combined in-sync and sync-loss monitor defined in claim 7 additionally including means for selectively establishing said predetermined informational count in said second memory means.

References Cited

UNITED STATES PATENTS

| | | | |
|---|---|---|---|
| 2,843,669 | 7/1958 | Six | 178—69.5 |
| 3,048,786 | 8/1962 | Berinson | 328—110 |
| 3,112,363 | 11/1963 | Schramel | 178—69.5 |
| 3,141,930 | 7/1964 | Krauss | 178—69.5 |
| 3,185,963 | 5/1965 | Peterson | 340—168 |

TERRELL W. FEARS, Primary Examiner

U.S. Cl. X.R.

328—110